(12) United States Patent
Park et al.

(10) Patent No.: US 11,002,938 B2
(45) Date of Patent: May 11, 2021

(54) LENS BARREL MEMBER

(71) Applicant: Lotte Advanced Materials Co., Ltd., Yeosu-si (KR)

(72) Inventors: Jee Kwon Park, Uiwang-si (KR); Ik Mo Kim, Uiwang-si (KR); Jung Ki Kim, Uiwang-si (KR); Sang Hyun Hong, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 162 days.

(21) Appl. No.: 16/232,209

(22) Filed: Dec. 26, 2018

(65) Prior Publication Data

US 2019/0196133 A1 Jun. 27, 2019

(30) Foreign Application Priority Data

Dec. 27, 2017 (KR) .......................... 10-2017-0180639

(51) Int. Cl.
*G02B 7/02* (2021.01)
*C08L 69/00* (2006.01)

(52) U.S. Cl.
CPC .............. *G02B 7/022* (2013.01); *C08L 69/00* (2013.01); *G02B 7/02* (2013.01)

(58) Field of Classification Search
CPC ............ G02B 7/022; G02B 7/02; C08L 69/00
USPC ................................ 359/811, 819, 827, 829
See application file for complete search history.

(56) References Cited

U.S. PATENT DOCUMENTS

| 6,362,269 B1* | 3/2002 | Ishihata | ................ | C08K 7/00 |
| | | | | 524/449 |
| 2014/0093682 A1 | 4/2014 | Nakamoto et al. | | |
| 2016/0178805 A1* | 6/2016 | Kang | ................ | G02B 7/022 |
| | | | | 359/614 |

(Continued)

FOREIGN PATENT DOCUMENTS

| CN | 101665620 A | 3/2010 |
| CN | 101899205 A | 12/2010 |
| CN | 103467757 A | 12/2013 |

(Continued)

OTHER PUBLICATIONS

Office Action in counterpart Korean Application No. 10-2017-0180639 dated Jul. 18, 2019, pp. 1-5.

(Continued)

*Primary Examiner* — William Choi
(74) *Attorney, Agent, or Firm* — Additon, Pendleton & Witherspoon, P.A.

(57) ABSTRACT

Disclosed herein is a lens barrel member. The lens barrel member includes: a lens barrel surrounding an outer periphery of a lens; and a housing receiving the lens barrel, the lens barrel being secured to the housing, wherein the lens barrel is formed of a lens barrel composition including: about 50 wt % to about 75 wt % of a polycarbonate resin; about 20 wt % to about 45 wt % of a glass fiber; about 0.5 wt % to about 3 wt % of a polyolefin wax; and about 0.5 wt % to about 3 wt % of a fluorinated olefin resin, and a weight ratio of the polyolefin wax to the fluorinated olefin resin ranges from about 1:0.3 to about 1:3. The lens barrel member can have a low coefficient of friction and/or good properties in terms of rigidity and/or dimensional stability.

16 Claims, 1 Drawing Sheet

(56) References Cited

U.S. PATENT DOCUMENTS

2018/0149778 A1    5/2018  Kang et al.

FOREIGN PATENT DOCUMENTS

| | | |
|---|---|---|
| CN | 103597032 A | 2/2014 |
| CN | 105717604 A | 6/2016 |
| EP | 1038920 A1 | 9/2000 |
| JP | 2007246824 A  * | 9/2007 |
| JP | 2010-015091 A | 1/2010 |
| JP | 5237531 B2 | 7/2013 |
| JP | 2014-214181 A | 11/2014 |
| KR | 10-2007-0080083 A | 8/2007 |

OTHER PUBLICATIONS

Office Action in counterpart Chinese Application No. 201811599453.5 dated Oct. 9, 2020, pp. 1-8.
English-translation of Office Action in counterpart Chinese Application No. 201811599453.5 dated Oct. 9, 2020, pp. 1-10.

* cited by examiner

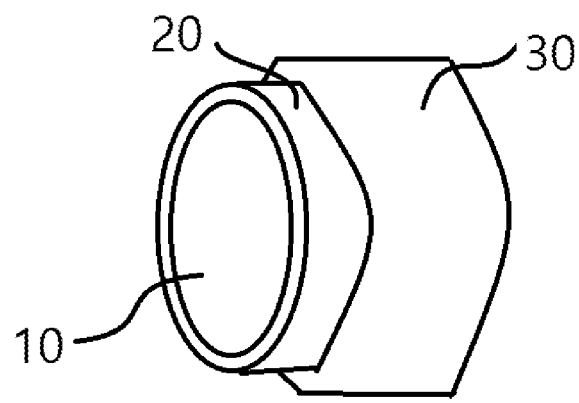

LENS BARREL MEMBER

CROSS-REFERENCE TO RELATED APPLICATION

This application claims priority under 35 USC Section 119 to and the benefit of Korean Patent Application No. 10-2017-0180639, filed Dec. 27, 2017, the entire disclosure of which is incorporated herein by reference.

FIELD

The present disclosure relates to a lens barrel member.

BACKGROUND

A lens barrel member used in a device, such as a digital camera or a closed circuit television (CCTV), serves to protect a lens while securing the lens to the device. A lens barrel of the lens barrel member is required to have good out-of-roundness and high levels of rigidity and impact resistance in order to secure smooth insertion of the lens into the lens barrel and smooth operation of the lens in the lens barrel. In addition, the lens barrel member has a structure in which a housing is coupled to the lens barrel. If a material for the lens barrel has a high coefficient of friction, assembly of the lens barrel member cannot be smoothly achieved upon coupling of the housing to the lens barrel via male and female threads, and excessive driving force, noise, dust and the like can be induced in the process of driving a related device, such as focusing, thereby causing deterioration in device performance.

In order to improve rigidity of the lens barrel member, a thermoplastic resin composition using glass fibers has been proposed. However, a molded article manufactured using the thermoplastic resin has a high coefficient of friction and exhibits poor properties in terms of out-of-roundness depending on orientation of the glass fibers.

Therefore, there is a need for a thermoplastic resin composition which allows a molded article formed therefrom to have a low coefficient of friction and good properties in terms of rigidity and dimensional stability (out-of-roundness).

SUMMARY OF THE INVENTION

The present disclosure relates to a lens barrel member which can have a low coefficient of friction and/or good properties in terms of rigidity, dimensional stability (out-of-roundness), appearance, and/or impact resistance.

The lens barrel member includes: a lens barrel surrounding an outer periphery of a lens; and a housing receiving the lens barrel, the lens barrel being secured to the housing, wherein the lens barrel is formed of a lens barrel composition including: about 50 wt % to about 75 wt % of a polycarbonate resin; about 20 wt % to about 45 wt % of glass fibers; about 0.5 wt % to about 3 wt % of a polyolefin wax; and about 0.5 wt % to about 3 wt % of a fluorinated olefin resin, and a weight ratio of the polyolefin wax to the fluorinated olefin resin ranges from about 1:0.3 to about 1:3.

The lens barrel may be coupled to the housing via male and female threads.

The polycarbonate resin may have a weight average molecular weight of about 20,000 g/mol to about 40,000 g/mol.

The glass fibers may be subjected to surface treatment with a urethane compound.

The polyolefin wax may have a weight average molecular weight of about 200 g/mol to about 10,000 g/mol.

The fluorinated olefin resin may include polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, and/or a combination thereof.

The fluorinated olefin resin may be a master batch obtained by blending a fluorine-based olefin resin with an aromatic vinyl resin.

The lens barrel may have a coefficient of static friction of about 0.1 to about 0.4, as measured in accordance with ASTM D1894.

The lens barrel may have a tensile strength of about 100 MPa to about 130 MPa, as measured on a 3.2 mm thick specimen in accordance with ASTM D638.

The lens barrel may have an out-of-roundness of about 90 μm or less, as calculated according to Equation 1:

$$\text{Out-of-roundness} = \text{longest inner diameter} - \text{shortest inner diameter} \qquad \text{[Equation 1]}$$

wherein, values of the longest inner diameter and the shortest inner diameter are found by measuring an inner diameter of a cylindrical specimen along an overall length of the specimen (50 mm) using an out-of-roundness measurement instrument, the specimen being prepared through a process in which the lens barrel composition is subjected to injection molding using a cylindrical mold having a size of 50 mm×30 mm×2 mm (length×inner diameter×thickness) at a cylinder temperature of 320° C. and a mold temperature of 70° C., followed by aging at room temperature for 24 hours.

The lens barrel member may be applied to a mobile phone camera, a CCTV, a vehicle black box, and/or a camera.

BRIEF DESCRIPTION OF DRAWINGS

FIG. 1 is a schematic view of a lens barrel member according to exemplary embodiments of the present disclosure.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways by those skilled in the art without departing from the scope of the present invention.

Rather, the embodiments are provided for complete disclosure and to provide thorough understanding of the present invention by those skilled in the art. The scope of the present invention should be defined only by the appended claims.

FIG. 1 is a schematic view of a lens barrel member according to exemplary embodiments of the present disclosure. Referring to FIG. 1, a lens barrel member according to the present disclosure can include: a lens barrel 20; and a housing 30 receiving the lens barrel 20. The lens barrel 20 surrounds an outer periphery of a lens 10 and is coupled to the housing 30 via male and female threads.

The lens barrel 20 may be formed of a lens barrel composition described below.

A lens barrel composition according to embodiments includes: (A) a polycarbonate resin; (B) glass fibers; (C) a polyolefin wax; and (D) a fluorinated olefin resin.

(A) Polycarbonate Resin

The polycarbonate resin may include any typical polycarbonate resin used in lens barrel compositions. For example, the polycarbonate resin may be an aromatic polycarbonate resin prepared by reacting diphenol(s) (aromatic diol compounds) with a precursor such as phosgene, halogen formate, and/or carbonate diester.

Examples of the diphenol s may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis-(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis-(4-hydroxyphenyl)propane, 2,2-bis(3,5-dichloro-4-hydroxyphenyl)propane, 2,2-bis(3-methyl-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may be a branched polycarbonate resin. The branched polycarbonate resin can be prepared by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

The polycarbonate resin may have a weight average molecular weight (Mw) of about 20,000 g/mol to about 40,000 g/mol, for example, about 22,000 g/mol to about 35,000 g/mol, as measured by gel permeation chromatography (GPC). Within this range, the lens barrel composition can exhibit good properties in terms of impact resistance and/or processability.

The lens barrel composition can include the polycarbonate resin in an amount of about 50 wt % to about 75 wt %, for example, about 55 wt % to about 70 wt %, based on the total weight (100 wt %) of the lens barrel composition. In some embodiments, the lens barrel composition can include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, or 75 wt % based on the total weight (100 wt %) of the lens barrel composition. Further, according to some embodiments, the polycarbonate resin may be present in an amount of from about any of the foregoing amounts to about any other of the foregoing amounts.

If the amount of the polycarbonate resin falls outside this range, the lens barrel composition may not have sufficient impact resistance and/or moldability.

(B) Glass Fibers

The glass fibers serve to improve the rigidity and dimensional stability of the lens barrel and to reduce the coefficient of friction of the lens barrel, and may be glass fibers subjected to surface treatment with a surface-treatment agent (for example, a sizing agent). The glass fibers may have an average diameter of about 8 μm to about 20 μm, for example about 9 μm to about 15 μm and an average length of about 2 to about 4 mm. When the average diameter and average length of the glass fibers fall within these ranges, the composition can be easily introduced into an extruder and rigidity of the lens barrel can be significantly improved. In addition, the glass fibers may have a circular shape, oval shape, rectangular shape, and/or dumbbell-like shape having two circles connected to each other, in cross-section. When the glass fibers have a circular cross section, the glass fibers may have a cross-sectional aspect ratio of 1. Herein, the term "cross-sectional aspect ratio" is defined as a ratio of the longest diameter of the glass fiber to the shortest diameter of the glass fiber in cross-section. When the glass fibers have an oval shape, the glass fibers have a cross-sectional aspect ratio greater than 1.

The surface treatment agent for the glass fibers may be a urethane compound. The urethane compound may include any commercially available urethane compound without limitation. In addition, the glass fibers may be subjected to surface treatment with the urethane compound by any typical method known in the art.

The lens barrel composition can include glass fibers in an amount of about 20 wt % to about 45 wt %, for example, about 25 wt % to about 40 wt %, based on the total weight (100 wt %) of the lens barrel composition. In some embodiments, the lens barrel composition can include glass fibers in an amount of about 20, 21, 22, 23, 24, 25, 26, 27, 28, 29, 30, 31, 32, 33, 34, 35, 36, 37, 38, 39, 40, 41, 42, 43, 44, or 45 wt % based on the total weight (100 wt %) of the lens barrel composition. Further, according to some embodiments, the glass fibers may be present in an amount of from about any of the foregoing amounts to about any other of the foregoing amounts.

If the amount of the glass fibers is less than about 20 wt %, the lens barrel can have poor properties in terms of impact resistance and/or rigidity, whereas, if the amount of the glass fiber exceeds about 45 wt %, the lens barrel can have a high coefficient of friction and/or poor properties in terms of dimensional stability and/or appearance.

(C) Polyolefin Wax

The polyolefin wax serves to reduce the coefficient of friction of the lens barrel and to improve dimensional stability of the lens barrel in conjunction with the fluorinated olefin resin, and may include any typical polyolefin wax used in thermoplastic resin compositions.

The polyolefin wax may have a weight average molecular weight (Mw) of about 200 g/mol to about 10,000 g/mol, for example, about 1,000 g/mol to about 8,000 g/mol, as measured by gel permeation chromatography (GPC). Within this range, the polyolefin wax can reduce the coefficient of friction of the lens barrel while improving dimensional stability of the lens barrel.

Examples of the polyolefin wax may include without limitation polyethylene wax, high-density polyethylene wax, polypropylene wax, an ethylene/acrylic acid copolymer, and/or an ethylene/vinyl acetate copolymer.

The lens barrel composition can include the polyolefin wax in an amount of about 0.5 wt % to about 3 wt %, for example, about 0.7 wt % to about 2.5 wt %, based on the total weight (100 wt %) of the lens barrel composition. In some embodiments, the lens barrel composition can include the polyolefin wax in an amount of about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 wt % based on the total weight (100 wt %) of the lens barrel composition. Further, according to some embodiments, the polyolefin wax may be present in an amount of from about any of the foregoing amounts to about any other of the foregoing amounts.

If the amount of the polyolefin wax is less than about 0.5 wt %, the lens barrel can have a high coefficient of friction and/or poor properties in terms of dimensional stability and/or appearance, whereas, if the amount of the polyolefin wax exceeds about 3 wt %, the lens barrel can have poor properties in terms of rigidity, impact resistance and the like.

(D) Fluorinated Olefin Resin

The fluorinated olefin resin serves to reduce the coefficient of friction of the lens barrel while improving dimensional stability of the lens barrel in conjunction with the polyolefin wax.

Examples of the fluorinated olefin resin may include polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, and combinations thereof, without being limited thereto.

The fluorinated olefin resin may be prepared by any known polymerization method. For example, the fluorinated olefin resin may be prepared in an aqueous medium containing a free radical-forming catalyst such as sodium, potassium, and/or ammonium peroxydisulfate.

The fluorinated olefin resin may be provided in the form of an emulsion, a powder, and/or a master batch obtained by blending with other resins. In one embodiment, the fluorinated olefin resin may be provided in the form of a master batch obtained by blending a fluorine-based olefin resin with an aromatic vinyl resin such as a styrene-acrylonitrile copolymer resin.

The lens barrel composition can include the fluorinated olefin resin in an amount of about 0.5 wt % to about 3 wt %, for example, about 0.5 wt % to about 2.5 wt %, based on the total weight (100 wt %) of the lens barrel composition. In some embodiments, the lens barrel composition can include the fluorinated olefin resin in an amount of about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 wt % based on the total weight (100 wt %) of the lens barrel composition. Further, according to some embodiments, the fluorinated olefin resin may be present in an amount of from about any of the foregoing amounts to about any other of the foregoing amounts.

If the amount of the fluorinated olefin resin is less than about 0.5 wt %, the lens barrel can have a high coefficient of friction and/or poor properties in terms of dimensional stability and/or appearance, whereas, if the amount of the fluorinated olefin resin exceeds about 3 wt %, the lens barrel can have poor properties in terms of rigidity, impact resistance and the like.

In exemplary embodiments, a weight ratio (C:D) of the polyolefin wax (C) to the fluorinated olefin resin (D) may range from about 1:0.3 to about 1:3, for example, from about 1:0.5 to about 1:2. In some embodiments, the weight ratio (C:D) of the polyolefin wax (C) to the fluorinated olefin resin (D) may be about 1:0.3, 1:0.4, 1:0.5, 1:0.6, 1:0.7, 1:0.8, 1:0.9, 1:1, 1:2, or 1:3. When the weight ratio falls outside this range, the lens barrel can have a high coefficient of friction and/or poor properties in terms of dimensional stability and/or appearance.

The lens barrel composition may optionally further include one or more additives such as but not limited to a release agent, a plasticizer, a heat stabilizer, a photostabilizer, a flame retardant, a flame retardant aid, an antioxidant, and/or fillers (different from the glass fibers described herein) without altering the effects of the invention.

The lens barrel 20 according to the present invention may be manufactured using the lens barrel composition set forth above by any suitable molding method such as injection molding, extrusion, vacuum molding, or casting. Such molding methods are well known to those skilled in the art to which the present invention pertains.

The lens barrel may have a coefficient of static friction of about 0.1 to about 0.4, for example, about 0.2 to about 0.35, as measured in accordance with ASTM D1894.

The lens barrel may have a tensile strength of about 100 MPa to about 130 MPa, for example, about 105 MPa to about 125 MPa, as measured on a 3.2 mm thick specimen at a tensile rate of 5 mm/min in accordance with ASTM D638.

The lens barrel may have an out-of-roundness (difference between the longest inner diameter and the shortest inner diameter of the lens barrel) of about 90 μm or less, for example, from about 70 μm to about 89 μm, as calculated according to Equation 1:

Out-of-roundness=longest inner diameter−shortest inner diameter. [Equation 1]

In Equation 1, the longest inner diameter and the shortest inner diameter are found by measuring the inner diameter of a cylindrical specimen along an overall length of the specimen (50 mm) using an out-of-roundness measurement instrument (Roundtest RA-2200, Mitutoyo Corporation), wherein the specimen is prepared through a process in which the lens barrel composition set forth above is subjected to injection molding using a cylindrical mold having a size of 50 mm×30 mm×2 mm (length×inner diameter×thickness) at a cylinder temperature of 320° C. and a mold temperature of 70° C., followed by aging at room temperature for 24 hours.

The lens barrel member according to the present invention may be applied to a mobile phone camera, a CCTV, a vehicle black box, and/or a camera, without being limited thereto.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Polycarbonate Resin

A bisphenol-A polycarbonate resin having a weight average molecular weight (Mw) of 24,000 g/mol (manufactured by Lotte Advanced Materials)

(B) Glass Fibers (B1) Glass fibers having a circular cross-section and subjected to surface treatment with a urethane compound (CSF 3PE-455W, Nitto Boseki Co., Ltd.)

(B2) Glass fibers having a rectangular cross-section and subjected to surface treatment with a urethane compound (CSG 3PA-832, Nitto Boseki Co., Ltd.)

(B3) Non-surface-treated glass fibers having a circular cross-section (415-14C, Owens Corning Inc.)

(B4) Glass fibers having a circular cross-section and subjected to surface treatment with an epoxy compound (CS 185F-4P, Owens Corning Inc.)

(C) Polyolefin Wax

A polyethylene wax having a weight average molecular weight of 1,100 g/mol (CS-14NJ, COSCHEM Co., Ltd.)

(D) Fluorinated Olefin Resin (D1) Polytetrafluoroethylene (PTFE) (FA-500, Daikin Industries)

(D2) A master batch obtained by blending polytetrafluoroethylene with a styrene-acrylonitrile copolymer (SAN) (Poly TS 30A, PACIFIC INTERCHEM Co., Ltd., polytetrafluoroethylene content: 50 wt %)

Examples 1 to 8 and Comparative Examples 1 to 9

The aforementioned components are mixed in amounts as listed in Tables 1 and 2 and then introduced into an extruder, followed by extrusion, thereby preparing a lens barrel composition in pellet form. Here, extrusion is performed at a barrel temperature of 280° C. using a twin-screw extruder (L/D: 36, Φ: 45 mm). The prepared pellets are dried at 100° C. for 4 hours or more and then subjected to injection molding using an injection machine at a cylinder temperature of 300° C. to 320° C., thereby preparing a specimen. The prepared specimen is left at 23° C. and 50% relative humidity (RH) for 24 hours and then evaluated as to the following properties. Results are shown in Tables 1 and 2.

Property Evaluation (1) Coefficient of static friction: The Coefficient of static friction of each of the specimens having a size of 63.5 mm×63.5 mm×1 mm prepared in the Examples and Comparative Examples under the conditions described above is measured in accordance with ASTM D1894.

(2) Tensile strength (unit: MPa): Tensile strength is measured on a 3.2 mm thick specimen prepared under the conditions as described above at a tensile rate of 5 mm/min in accordance with ASTM D638.

(3) Out-of-roundness (unit: μm): Out-of-roundness is calculated according to Equation 1:

Out-of-roundness=longest inner diameter−shortest inner diameter    [Equation 1]

In Equation 1, the longest inner diameter and the shortest inner diameter were found by measuring the inner diameter of a cylindrical specimen along the overall length of the specimen (50 mm) using an out-of-roundness measurement instrument (Roundtest RA-2200, Mitutoyo Corporation), wherein the specimen was prepared through a process in which the lens barrel composition set forth above was subjected to injection molding using a cylindrical mold having a size of 50 mm×30 mm×2 mm (length×inner diameter×thickness) at a cylinder temperature of 320° C. and at a mold temperature of 70° C., followed by aging at room temperature (23° C.) for 24 hours.

TABLE 1

| | | Example | | | | | | | |
|---|---|---|---|---|---|---|---|---|---|
| | | 1 | 2 | 3 | 4 | 5 | 6 | 7 | 8 |
| (A) (wt %) | | 68 | 68 | 68 | 68 | 58 | 58 | 68 | 68 |
| (B) (wt %) | (B1) | 30 | — | 30 | — | 40 | — | 30 | 30 |
| | (B2) | — | 30 | — | 30 | — | 40 | — | — |
| | (B3) | — | — | — | — | — | — | — | — |
| | (B4) | — | — | — | — | — | — | — | — |
| (C) (wt %) | | 1 | 1 | 1 | 1 | 1 | 1 | 0.7 | 1.3 |
| (D) (wt %) | (D1) | 1 | 1 | — | — | 1 | 1 | 1.3 | 0.7 |
| | (D2) | — | — | 1 | 1 | — | — | — | — |
| Coefficient of static friction | | 0.28 | 0.25 | 0.30 | 0.23 | 0.33 | 0.30 | 0.25 | 0.31 |
| Tensile strength (MPa) | | 110 | 108 | 107 | 105 | 120 | 117 | 106 | 105 |
| Out-of-roundness (μm) | | 88 | 81 | 86 | 80 | 85 | 76 | 87 | 88 |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| (A) (wt %) | | 68 | 68 | 69 | 69 | 64 | 64 | 70 | 83 | 38 |
| (B) (wt %) | (B1) | — | — | 30 | 30 | 30 | 30 | 30 | 15 | 60 |
| | (B2) | — | — | — | — | — | — | — | — | — |
| | (B3) | 30 | — | — | — | — | — | — | — | — |
| | (B4) | — | 30 | — | — | — | — | — | — | — |
| (C) (wt %) | | 1 | 1 | — | 1 | 5 | 1 | — | 1 | 1 |
| (D) (wt %) | (D1) | 1 | 1 | 1 | — | 1 | 5 | — | 1 | 1 |
| | (D2) | — | — | — | — | — | — | — | — | — |
| Coefficient of static friction | | 0.51 | 0.32 | 0.42 | 0.44 | 0.33 | Not extrudable | 0.53 | 0.28 | Not extrudable |
| Tensile strength (MPa) | | 70 | 115 | 112 | 108 | 80 | | 115 | 63 | |
| Out-of-roundness (μm) | | 131 | 113 | 97 | 95 | 90 | | 103 | 86 | |

From the results shown in Tables 1 and 2, it can be seen that the lens barrel manufactured using the lens barrel composition according to the present invention has a low coefficient of static friction of 0.33 or less and good properties in terms of rigidity and dimensional stability (out-of-roundness).

Conversely, the lens barrel manufactured using the lens barrel composition of Comparative Example 1, in which the non-surface-treated glass fibers (B3) are used instead of the glass fibers (B1) or (B2) subjected to surface treatment with the urethane compound according to the present invention, has a high coefficient of static friction, causing difficulty in assembling and operating the lens barrel member and exhibits poor properties in terms of rigidity and dimensional stability (out-of-roundness). The lens barrel manufactured using the lens barrel composition of Comparative Example 2, in which the glass fibers (B4) are subjected to surface treatment with the epoxy compound, exhibits poor properties in terms of dimensional stability (out-of-roundness). The lens barrels manufactured using the lens barrel compositions of Comparative Examples 3, 4, and 7, which are free from the polyolefin wax (C) and/or the fluorinated olefin resin (D), have poor dimensional stability and a high coefficient of static friction, causing difficulty in assembling and operating the lens barrel member. The lens barrel manufactured using the lens barrel composition of Comparative Example 5, in which an excess of the polyolefin wax (C) is used, exhibits poor properties in terms of tensile strength (rigidity). The lens barrel composition of Comparative Example 6, in which an excess of the fluorinated olefin resin (D) is used, could not be extruded. The lens barrel manufactured using the lens barrel composition of Comparative Example 8, in which an insufficient amount of the glass fibers is used, exhibits poor properties in terms of tensile strength (rigidity). The lens barrel composition of Comparative Example 9 using an excess of the glass fibers could not be extruded.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A lens barrel member, comprising:
a lens barrel surrounding an outer periphery of a lens; and
a housing receiving the lens barrel, the lens barrel being secured to the housing,
wherein the lens barrel is formed of a lens barrel composition comprising: about 50 wt % to about 75 wt % of a polycarbonate resin; about 20 wt % to about 45 wt % of glass fibers; about 0.5 wt % to about 3 wt % of a polyolefin wax; and about 0.5 wt % to about 3 wt % of a fluorinated olefin resin, and wherein a weight ratio of the polyolefin wax to the fluorinated olefin resin ranges from about 1:0.3 to about 1:3, and
wherein the lens barrel has a coefficient of static friction of about 0.1 to about 0.4, as measured in accordance with ASTM D1894 and a tensile strength of about 100 MPa to about 130 MPa, as measured on a 3.2 mm thick specimen in accordance with ASTM D638.

2. The lens barrel member according to claim 1, wherein the lens barrel is coupled to the housing via male and female threads.

3. The lens barrel member according to claim 1, wherein the polycarbonate resin has a weight average molecular weight of about 20,000 g/mol to about 40,000 g/mol.

4. The lens barrel member according to claim 1, wherein the glass fibers are surface treated a urethane compound.

5. The lens barrel member according to claim 1, wherein the polyolefin wax has a weight average molecular weight of about 200 g/mol to about 10,000 g/mol.

6. The lens barrel member according to claim 1, wherein the fluorinated olefin resin comprises polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, and/or a combination thereof.

7. The lens barrel member according to claim 1, wherein the fluorinated olefin resin is a master batch obtained by blending a fluorine-based olefin resin with an aromatic vinyl resin.

8. The lens barrel member according to claim 1, wherein the lens barrel has an out-of-roundness of about 90 μm or less, as calculated according to Equation 1:

$$\text{Out-of-roundness} = \text{longest inner diameter} - \text{shortest inner diameter} \quad [\text{Equation 1}]$$

wherein, values of the longest inner diameter and the shortest inner diameter are found by measuring an inner diameter of a cylindrical specimen along an overall length of the specimen (50 mm) using an out-of-roundness measurement instrument, the specimen being prepared through a process in which the lens barrel composition is subjected to injection molding using a cylindrical mold having a size of 50 mm×30 mm×2 mm (length×inner diameter×thickness) at a cylinder temperature of 320° C. and a mold temperature of 70° C., followed by aging at room temperature for 24 hours.

9. The lens barrel member according to claim 1, wherein the lens barrel member is part of a mobile phone camera.

10. The lens barrel member according to claim 1, wherein the lens barrel member is part of a closed circuit television (CCTV).

11. The lens barrel member according to claim 1, wherein the lens barrel member is part of a vehicle black box.

12. The lens barrel member according to claim 1, wherein the lens barrel member is part of a camera.

13. A lens barrel member, comprising:

a lens barrel surrounding an outer periphery of a lens; and a housing receiving the lens barrel, the lens barrel being secured to the housing, wherein the lens barrel is formed of a lens barrel composition comprising: about 50 wt % to about 75 wt % of a polycarbonate resin; about 20 wt % to about 45 wt % of glass fibers; about 0.5 wt % to about 3 wt % of a polyolefin wax; and about 0.5 wt % to about 3 wt % of a fluorinated olefin resin, and wherein a weight ratio of the polyolefin wax to the fluorinated olefin resin ranges from about 1:0.3 to about 1:3, and wherein the lens barrel has an out-of-roundness of about 90 μm or less, as calculated according to Equation 1:

Out-of-roundness=longest inner diameter−shortest inner diameter  [Equation 1]

wherein, values of the longest inner diameter and the shortest inner diameter are found by measuring an inner diameter of a cylindrical specimen along an overall length of the specimen (50 mm) using an out-of-roundness measurement instrument, the specimen being prepared through a process in which the lens barrel composition is subjected to injection molding using a cylindrical mold having a size of 50 mm×30 mm×2 mm (length×inner diameter×thickness) at a cylinder temperature of 320° C. and a mold temperature of 70° C., followed by aging at room temperature for 24 hours.

14. The lens barrel member according to claim 13, wherein the lens barrel has a coefficient of static friction of about 0.1 to about 0.4, as measured in accordance with ASTM D1894.

15. The lens barrel member according to claim 13, wherein the lens barrel has a tensile strength of about 100 MPa to about 130 MPa, as measured on a 3.2 mm thick specimen in accordance with ASTM D638.

16. A lens barrel member, comprising:

a lens barrel surrounding an outer periphery of a lens; and a housing receiving the lens barrel, the lens barrel being secured to the housing, wherein the lens barrel is formed of a lens barrel composition comprising: about 50 wt % to about 75 wt % of a polycarbonate resin; about 20 wt % to about 45 wt % of glass fibers; about 0.5 wt % to about 3 wt % of a polyolefin wax; and about 0.5 wt % to about 3 wt % of a fluorinated olefin resin, and wherein a weight ratio of the polyolefin wax to the fluorinated olefin resin ranges from about 1:0.3 to about 1:3, and wherein the lens barrel has a coefficient of static friction of about 0.1 to about 0.4, as measured in accordance with ASTM D1894.

* * * * *